US009764695B2

(12) United States Patent
Nakano

(10) Patent No.: US 9,764,695 B2
(45) Date of Patent: Sep. 19, 2017

(54) PANEL MEMBER JOINING STRUCTURE

(71) Applicant: TOYOTA JIDOSHA KABUSHIKI KAISHA, Toyota-shi, Aichi-ken (JP)

(72) Inventor: Shirou Nakano, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 15/010,001

(22) Filed: Jan. 29, 2016

(65) Prior Publication Data

US 2016/0243999 A1 Aug. 25, 2016

(30) Foreign Application Priority Data

Feb. 23, 2015 (JP) ................................ 2015-033283

(51) Int. Cl.
*B32B 3/28* (2006.01)
*B60R 13/00* (2006.01)
*B32B 7/12* (2006.01)

(52) U.S. Cl.
CPC ................ *B60R 13/00* (2013.01); *B32B 3/28* (2013.01); *B32B 7/12* (2013.01); *B32B 2250/04* (2013.01); *B32B 2605/00* (2013.01)

(58) Field of Classification Search
CPC ........... Y10T 428/19; Y10T 428/24628; Y10T 428/12264; Y10T 428/12354; Y10T 428/1241; B32B 3/28; E04C 2/324
USPC ........................................................... 428/57
See application file for complete search history.

(56) References Cited

FOREIGN PATENT DOCUMENTS

JP 2005-306235 A 11/2005

*Primary Examiner* — Alexander Thomas
(74) *Attorney, Agent, or Firm* — Oliff PLC

(57) ABSTRACT

At the inner side adhesion portion 28, a portion of the inner side vertical wall portion 22 is formed so as to be recessed to an inner side. An inclination angle θ2 of the inner side adhesion portion 28 with respect to a vehicle up-and-down direction is set to be greater than an inclination angle θ1 of the inner side vertical wall portion 22. At the outer side adhesion portion 38, a portion of the outer side vertical wall portion 32 is formed so as to be recessed to the inner side. An inclination angle θ4 of the outer side adhesion portion 38 with respect to the vehicle up-and-down direction is set to be greater than an inclination angle θ3 of the outer side vertical wall portion 32.

4 Claims, 9 Drawing Sheets

UP
FR
W
30
34
2
32A
36
38
32B
32
10
36
20
24
22A
28
26
S
22
22B
26
2

10
30
32A
32B
36
38
34
32
36
28
S
2
2
26
24
22A
22B
22
26
20
UP
W
FR

UP
W
32A
34
32A
θ4
θ3
38
32
30
38
32
22A
24
S
22A
32B
θ2
32B
θ1
36
22
28
28
22
36
20
22B
22B
26
26

UP
W
32A
34
32A
22A
24
38
38
22A
32
32
22
22
28
28
36
32B
32B
36
22B
22B
S
26
26

UP
W
14
34
32A
32A
22A
24
22A
38
38
22
22
32
28
28
32
36
32B
32B
36
22B
22B
26
26

30
32A
32B
36
34
38
32
36
29
S
24
22A
26
22
22B
20
26
UP
W
FR 40
46
32A
32B
36
48
34
7
S
44
32
36
26
24
22A
22
22B
26
42
W
UP
FR

PANEL MEMBER JOINING STRUCTURE

CROSS-REFERENCE TO RELATED APPLICATION

This application claims priority under 35 USC 119 from Japanese Patent Application No. 2015-033283 filed on Feb. 23, 2015, the disclosure of which is incorporated by reference herein.

TECHNICAL FIELD

The present invention relates to a panel member joining structure to be used in a vehicle.

RELATED ART

Heretofore, when panel members structuring a vehicle were to be joined together, an adhesive has been used to join the panel members. For example, Japanese Patent Application Laid-Open (JP-A) No. 2005-306235 discloses a structure in which an outer reinforcement with a hat shape in cross section and an inner reinforcement arranged along the inner side of the outer reinforcement are joined at vertical wall portions by an adhesive.

During assembly according to the joining structure recited in Japanese Patent Application Laid-Open (JP-A) No. 2005-306235, if the adhesive is applied to the outer face of a vertical wall portion of the inner reinforcement and this outer face is superposed with the outer reinforcement, the region to which the adhesive has been applied may rub against the inner face of the outer reinforcement and the adhesive may be scraped off.

SUMMARY

In consideration of the circumstances described above, an object of the present invention is to provide a panel member joining structure that may inhibit scraping off of an adhesive during assembly.

In order to achieve the object described above, a panel member joining structure according to a first aspect of the present invention includes: a first panel member including a pair of inner side vertical wall portions that are disposed in opposition to one another; a second panel member including a pair of outer side vertical wall portions that are disposed in opposition to one another and an outer side connection portion that connects ends at one side of the pair of outer side vertical wall portions, the second panel member being placed along outer sides of the inner side vertical wall portions of the first panel member, from ends at another side of the pair of outer side vertical wall portions, and the pair of outer side vertical wall portions being disposed at the outer sides of the pair of inner side vertical wall portions; an inner side adhesion portion at which a portion of the inner side vertical wall portions is formed in a protruding shape or a recess shape such that an inclination angle of the inner side adhesion portion with respect to a direction of placement of the second panel member is greater than an inclination angle of the inner side vertical wall portions; an outer side adhesion portion at which a portion of the outer side vertical wall portions is formed in whichever of a protruding shape or a recess shape is the same direction as the inner side adhesion portion such that an inclination angle of the outer side adhesion portion with respect to the direction of placement of the second panel member is greater than an inclination angle of the outer side vertical wall portions, the outer side adhesion portion being superimposed on the inner side adhesion portion; and an adhesive layer that adheres an outer face of the inner side adhesion portion to an inner face of the outer side adhesion portion.

When the first panel member and second panel member of the panel member joining structure according to the first aspect of the present invention are being assembled, the outer side adhesion portion is matched up with the outer side of the inner side adhesion portion and the second panel member is placed against the pair of inner side vertical wall portions of the first panel member, from the other end sides of the pair of outer side vertical wall portions. At this time, the adhesive is coated onto the inner side adhesion portion of the inner side vertical wall portions or the outer side adhesion portion of the outer side vertical wall portions, and the outer side vertical wall portions are put in place. Because the inclination angle of the inner side adhesion portion relative to the direction of placing is larger than the inclination angle of the inner side vertical wall portions, contact between the inner side adhesion portion and the outer side adhesion portion may be avoided. That is, even if the second panel is tilted or displaced in one direction relative to the first panel member while being put in place, the outer side vertical wall portions come into contact with the inner side vertical wall portions. Therefore, the outer side adhesion portion is unlikely to come into contact with the inner side adhesion portion. Therefore, when the second panel member is being placed against the first panel member, contact between a region to which adhesive has been applied and other regions may be inhibited.

In a panel member joining structure according to a second aspect of the present invention, the first panel member further includes an inner side connection portion that connects ends at oneside of the pair of inner side vertical wall portions to one another.

According to the panel member joining structure according to the second aspect of the present invention, the inner side connection portion of the first panel member may be superposed with the outer side connection portion of the second panel member and joining strength may be raised.

A panel member joining structure according to a third aspect of the present invention further includes first flange portions that project in divergent directions from ends at another side of the pair of inner side vertical wall portions of the first panel member.

According to the panel member joining structure according to the third aspect of the present invention, because the first flange portions are provided at the first panel member, the first panel member may be assuredly joined to another member.

A panel member joining structure according to a fourth aspect of the present invention further includes second flange portions that project in divergent directions from one another from the ends at the other side of the pair of outer side vertical wall portions of the second panel member.

According to the panel member joining structure according to the fourth aspect of the present invention, because the second flange portions are provided at the second panel member, the second panel member may be assuredly joined to another member and/or to the first flange portions of the first panel member.

Advantageous Effects of Invention

According to the panel member joining structure according to the first aspect of the present invention, scraping off of adhesive during assembly of the first panel member and the second panel member may be inhibited.

According to the panel member joining structure according to the second aspect of the present invention, joining strength between the first panel member and the second panel member may be raised.

According to the panel member joining structure according to the third aspect of the present invention, the first panel member may be assuredly joined to another member.

According to the panel member joining structure according to the fourth aspect of the present invention, the second panel member may be assuredly joined to another member or to the first flange portions of the first panel member.

BRIEF DESCRIPTION OF THE DRAWINGS

Embodiments of the present invention will be described in detail based on the following figures, wherein.

DETAILED DESCRIPTION OF THE INVENTION

First Exemplary Embodiment

Figure 1:
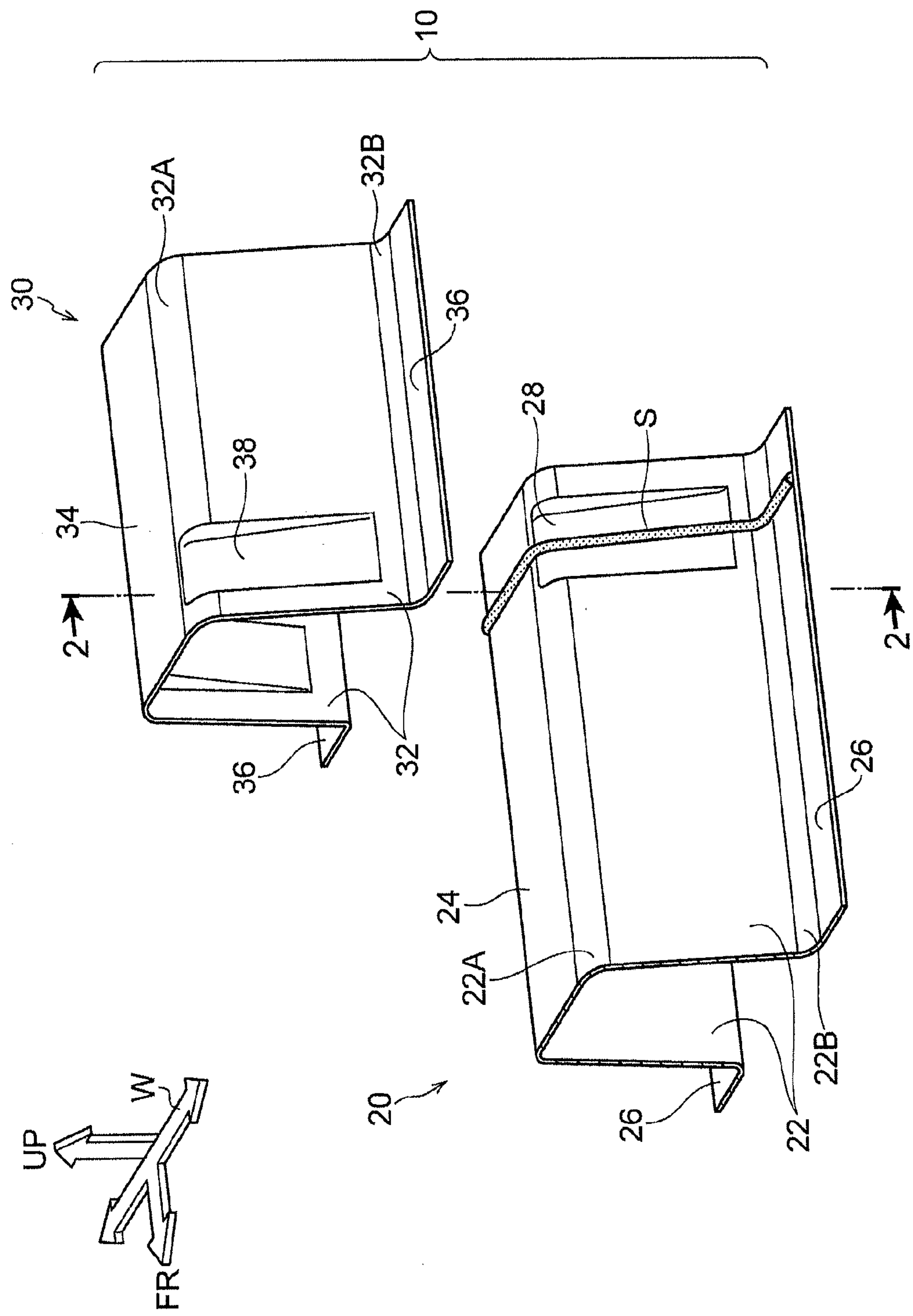
FIG. 1 is a perspective view of a first panel member and second panel member of a panel joining structure in accordance with a first exemplary embodiment.

Herebelow, a first exemplary embodiment of a panel joining structure according to the present invention is described with reference to the attached drawings. The panel joining structure according to the present exemplary embodiment may be applied to a front-and-rear direction mating portion of a "tunnel" portion of a floor panel of a vehicle, to a rear floor side panel of a vehicle, to a dash panel mating portion, or the like. The arrow UP that is shown as appropriate in the drawings indicates a vehicle body upper direction, an arrow FR indicates the vehicle body front direction, and an arrow W indicates the vehicle width direction.

As shown in FIG. 1, a panel joining structure 10 according to the present exemplary embodiment is provided with a first panel member 20 and a second panel member 30. The first panel member 20 is formed in a hat shape in cross section and is formed to be long in the vehicle front-and-rear direction. The first panel member 20 includes a pair of inner side vertical wall portions 22, an inner side connection portion 24 and a pair of first flange portions 26.

Figure 2A:
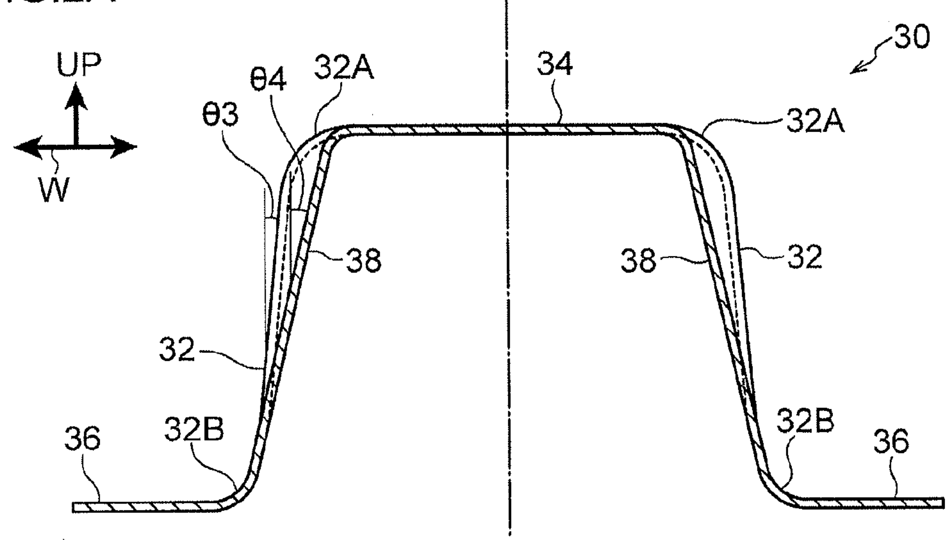
FIG. 2A and FIG. 2B are sectional views taken along line 2-2 in FIG. 1.
Figure 2B:
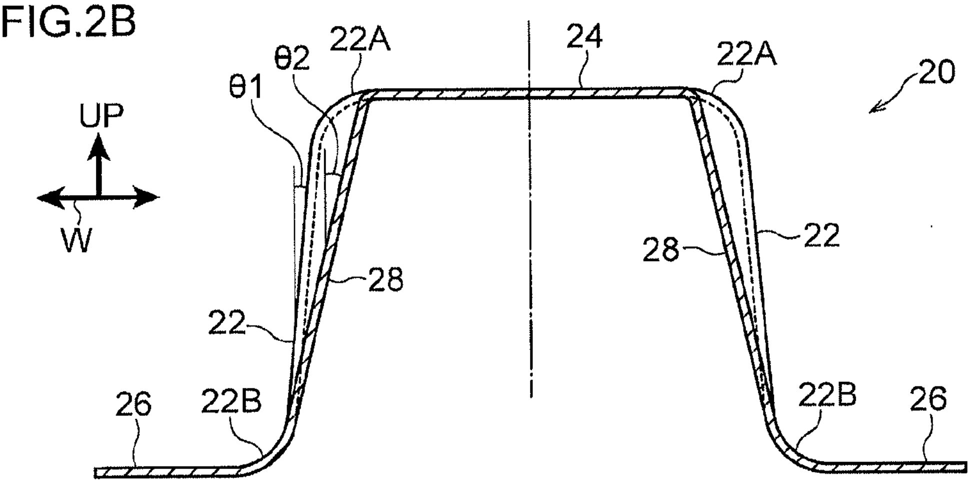

As shown in FIG. 2B, the pair of inner side vertical wall portions 22 are opposingly disposed such that a separation therebetween gradually widens from respective one end sides 22A thereof toward other end sides 22B. An inclination angle of each inner side vertical wall portion 22 with respect to the vehicle up-and-down direction is θ1. The inner side connection portion 24 connects between the one end sides 22A of the pair of inner side vertical wall portions 22. The first flange portions 26 project in directions away from one another from the respective other end sides 22B of the pair of inner side vertical wall portions 22.

An inner side adhesion portion 28 is formed at each of the pair of inner side vertical wall portions 22. The inner side adhesion portion 28 is formed at one end side of the inner side vertical wall portion 22 in the vehicle front-and-rear direction and is formed such that a portion of the inner side vertical wall portion 22 is recessed toward the inner side (i.e., such that the inner side adhesion portion 28 is in a recess shape as viewed from the outer side). The inner side adhesion portion 28 is inclined toward the vehicle width direction outer side from the one end side 22A toward the other end side 22B. An inclination angle of the inner side adhesion portion 28 with respect to the vehicle up-and-down direction is θ2. The inclination angle θ2 is set to be larger than the inclination angle θ1.

Similarly to the first panel member 20, the second panel member 30 is formed in a hat shape in cross section and is formed to be long in the vehicle front-and-rear direction. The second panel member 30 includes a pair of outer side vertical wall portions 32, an outer side connection portion 34 and a pair of second flange portions 36.

As shown in FIG. 2A, the pair of outer side vertical wall portions 32 are opposingly disposed such that a separation therebetween gradually widens from respective one end sides 32A thereof toward other end sides 32B. An inclination angle of each outer side vertical wall portion 32 with respect to the vehicle up-and-down direction is θ3. The inclination angle θ3 is set to be substantially the same as the inclination angle θ1 or a little larger than the inclination angle θ1. The outer side connection portion 34 connects between the one end sides 32A of the pair of outer side vertical wall portions 32. The outer side connection portion 34 is set to a slightly longer length in the vehicle width direction than the inner side connection portion 24. The second flange portions 36 project in directions away from one another from the respective other end sides 32B of the pair of outer side vertical wall portions 32.

An outer side adhesion portion 38 is formed at each of the pair of outer side vertical wall portions 32. The outer side adhesion portion 38 is formed at another end side of the outer side vertical wall portion 32 in the vehicle front-andrear direction and is formed such that a portion of the outer side vertical wall portion 32 is recessed toward the inner side (i.e., such that the outer side adhesion portion 38 is in a recess shape as viewed from the outer side). A length of the outer side adhesion portion 38 in the vehicle front-and-rear direction is set to be shorter than the length of the inner side adhesion portion 28. The outer side adhesion portion 38 is inclined toward the vehicle width direction outer side from the one end side 32A toward the other end side 32B. An inclination angle of the outer side adhesion portion 38 with respect to the vehicle up-and-down direction is θ4. The inclination angle θ4 is set to be larger than the inclination angle θ3, and the inclination angle θ4 is set to be substantially the same as the inclination angle θ2 of the first panel member 20 or a little larger than the inclination angle θ2.

Figure 3A:
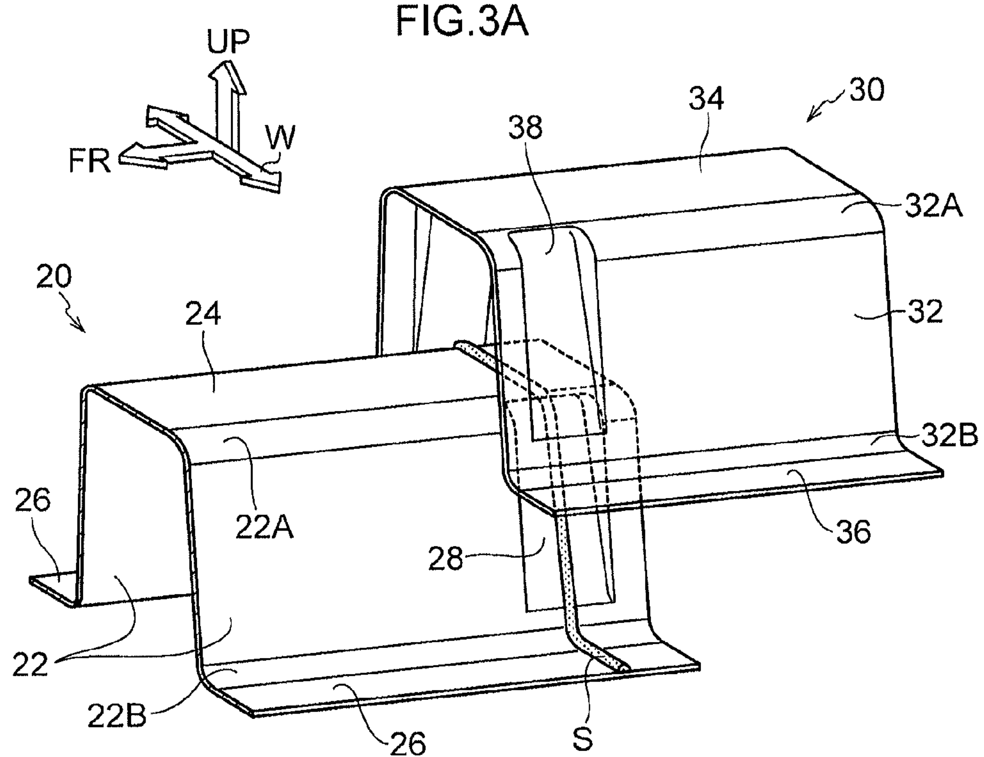
FIG. 3A is a perspective view showing a state partway through assembly of the second panel member to the first panel member.
Figure 3B:
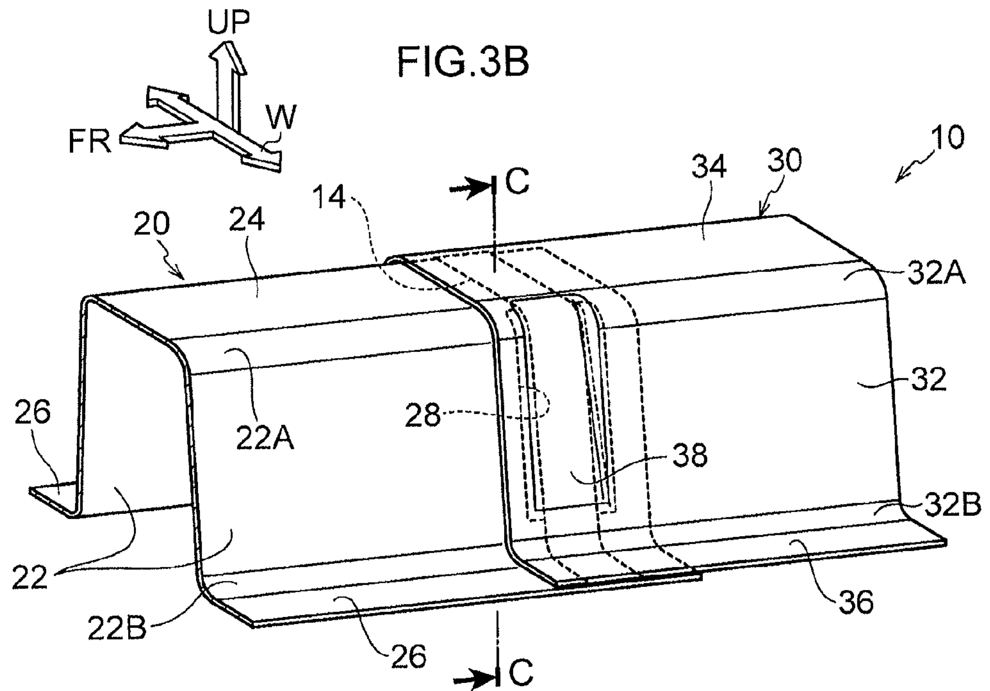
FIG. 3B is a perspective view showing a state when the assembly of the second panel member to the first panel member is completed.
Figure 4A:
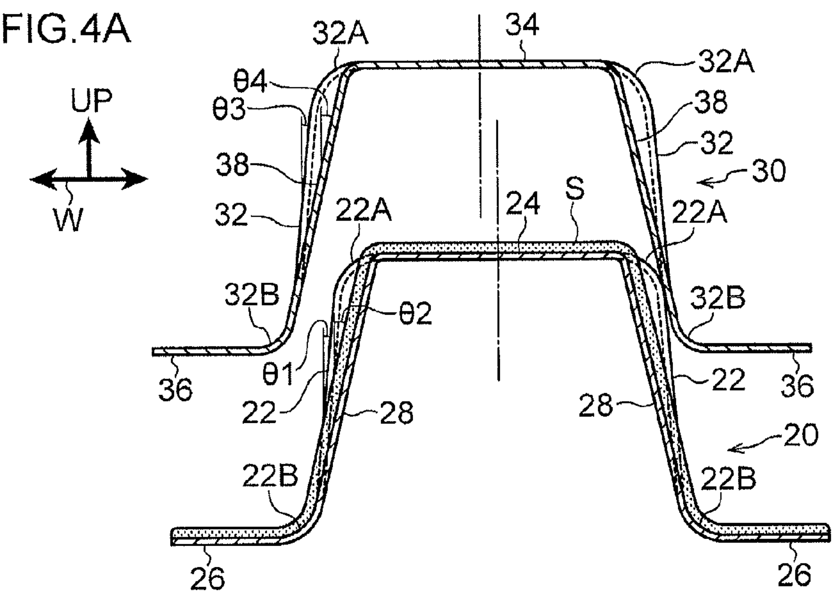
FIG. 4A is a sectional view showing the state partway through assembly of the second panel member to the first panel member.
Figure 4B:
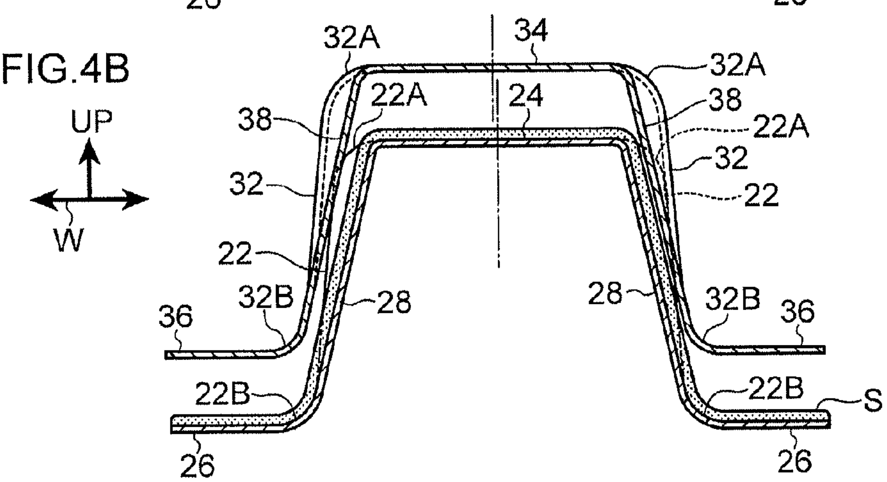
FIG. 4B is a sectional view showing another state partway through assembly of the second panel member to the first panel member.
Figure 4C:
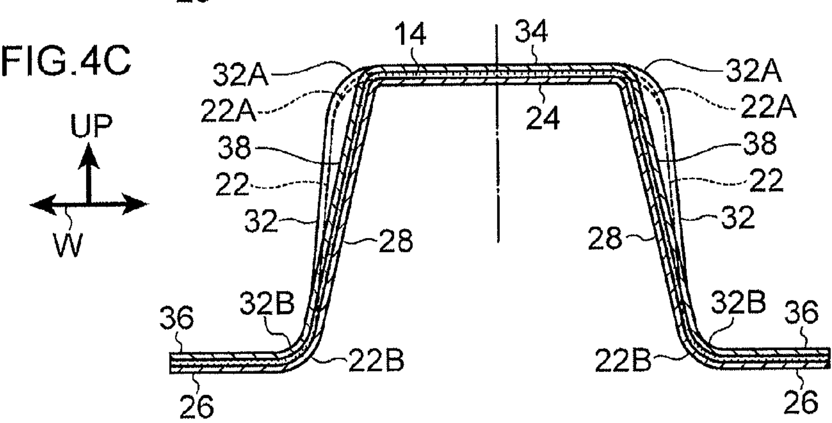
FIG. 4C is a sectional view showing the state when the assembly of the second panel member to the first panel member is completed.

As shown in FIG. 3B and FIG. 4C, the first panel member 20 and the second panel member 30 are superposed with the outer side adhesion portions 38 of the second panel member 30 being placed over the inner side adhesion portions 28 of the first panel member 20 from the vehicle upper side, and the first panel member 20 and second panel member 30 are joined via an adhesive layer 14. The meaning of "the first panel member 20 and the second panel member 30 are superposed" includes states in which the first panel member 20 and the second panel member 30 are disposed with a gap of a tolerable size therebetween or with no gap. The direction in which the second panel member 30 is placed onto the first panel member 20 is the vehicle up-and-down direction.

The first panel member 20 and second panel member 30 are joined with the pair of inner side vertical wall portions 22 being disposed substantially in parallel with the pair of outer side vertical wall portions 32, the inner side connection portion 24 being disposed substantially in parallel with the outer side connection portion 34, the pair of first flange portions 26 being disposed substantially in parallel with the pair of second flange portions 36, and the pair of inner side adhesion portions 28 being disposed substantially in parallel with the pair of outer side adhesion portions 38.

Now, operation and effects of the present exemplary embodiment are described.

When the first panel member 20 and second panel member 30 are to be joined, an adhesive S is applied, along the line of the inner side adhesion portions 28 of the first panel member 20, to the first flange portions 26, the inner side adhesion portions 28 and the inner side connection portion 24 (see FIG. 1). Then, as illustrated in FIG. 3A, the second panel member 30 is disposed at the outer side of the first panel member 20, at a position at which the inner side adhesion portions 28 and the outer side adhesion portions 38 coincide in the vehicle front-and-rear direction. The other end sides 32B of the second panel member 30 are then moved from the one end sides 22A toward the other end sides 22B. During this movement, as illustrated in FIG. 4A, even if the second panel member 30 is tilted or displaced in one direction relative to the first panel member 20, because the inclination angle θ2 of the inner side adhesion portions 28 is greater than the inclination angle θ1 of the inner side vertical wall portions 22, the outer side vertical wall portions 32 come into contact with the inner side vertical wall portions 22 and move while being guided by the inner side vertical wall portions 22, as illustrated in FIG. 4B. Therefore, the outer side adhesion portions 38 can be disposed at an assembly completion position (see FIG. 4C) without coming into contact with the inner side adhesion portions 28 during the movement or, even if the outer side adhesion portions 38 do come into contact with the inner side adhesion portions 28 due to component errors or the like, the outer side adhesion portions 38 are in contact only with small regions in the vicinities of the other end sides 22B.

According to the panel joining structure 10 in accordance with the present exemplary embodiment, when the first panel member 20 and second panel member 30 are being assembled, the outer side adhesion portions 38 are unlikely to touch against the inner side adhesion portions 28 to which the adhesive S has been applied. Therefore, scraping off of the adhesive S during the assembly may be inhibited, and a reduction in joining strength between the first panel member 20 and the second panel member 30 may be suppressed.

Figure 5:
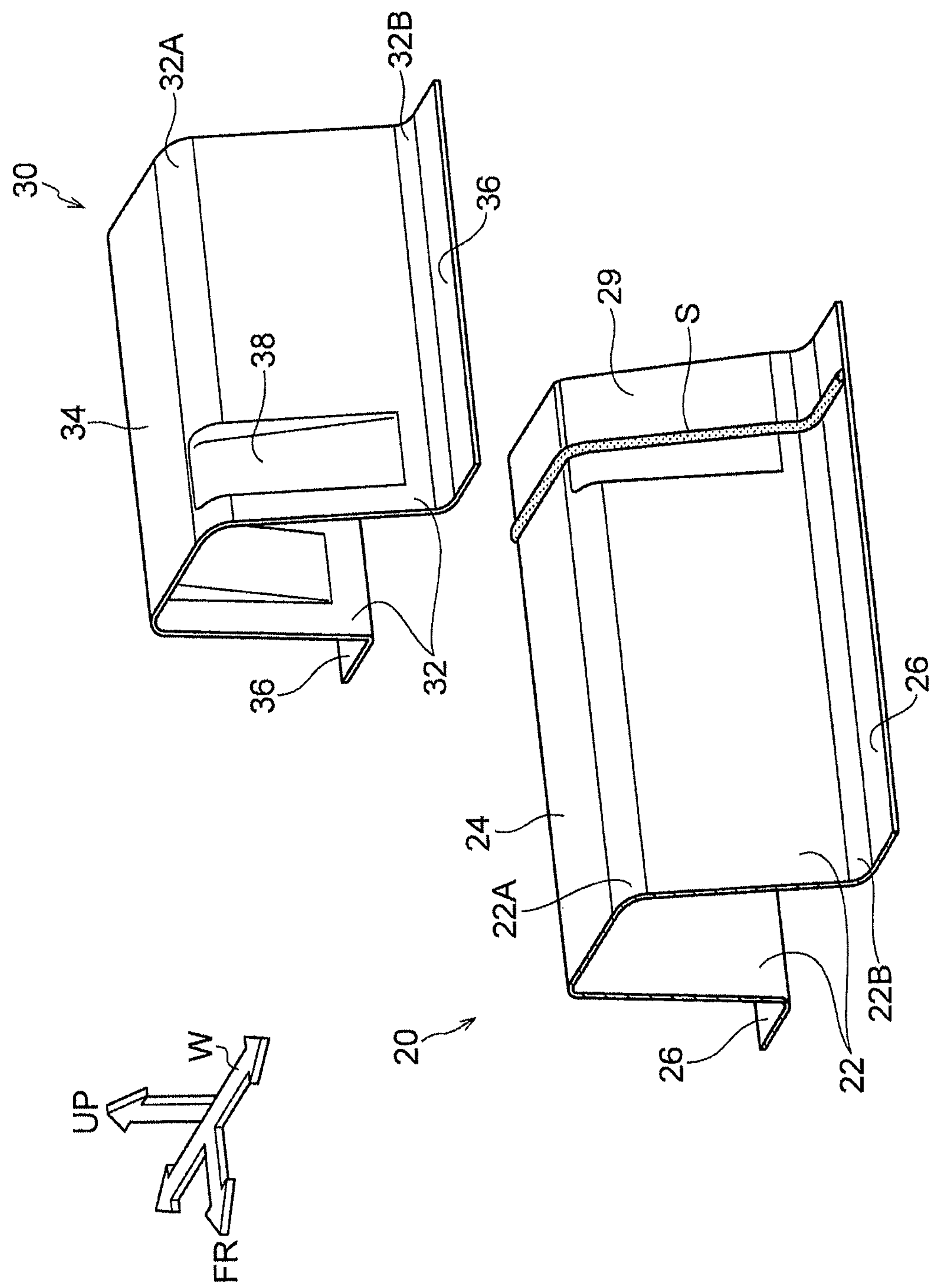
FIG. 5 is a perspective view of a first panel member and second panel member of a panel joining structure in accordance with a variant example of the first exemplary embodiment.

The present exemplary embodiment has a structure in which general surfaces of the inner side vertical wall portions 22 are formed at an end portion side relative to the inner side adhesion portions 28. However, as illustrated in FIG. 5, the inner side adhesion portions may be formed as inner side adhesion portions 29 that are formed wholly at end portions.

Second Exemplary Embodiment

Figure 6:
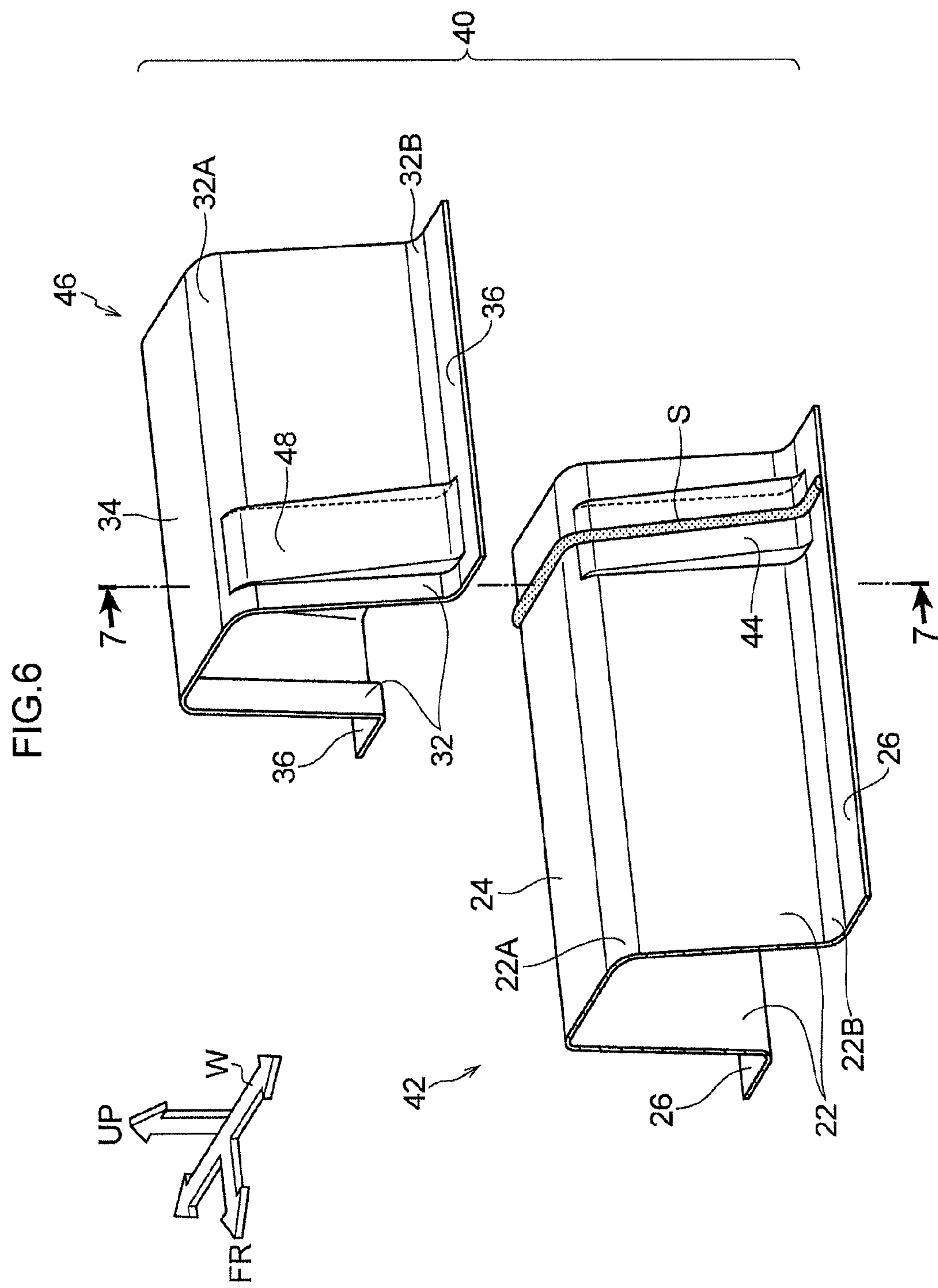
FIG. 6 is a perspective view of a first panel member and second panel member of a panel joining structure in accordance with a second exemplary embodiment.

Now, a second exemplary embodiment of the panel joining structure according to the present invention is described. In the present exemplary embodiment, portions that are the same as in the first exemplary embodiment are assigned the same reference symbols and detailed descriptions thereof are not given. As shown in FIG. 6, a panel joining structure 40 according to the present exemplary embodiment is provided with a first panel member 42 and a second panel member 46.

Figure 7A:
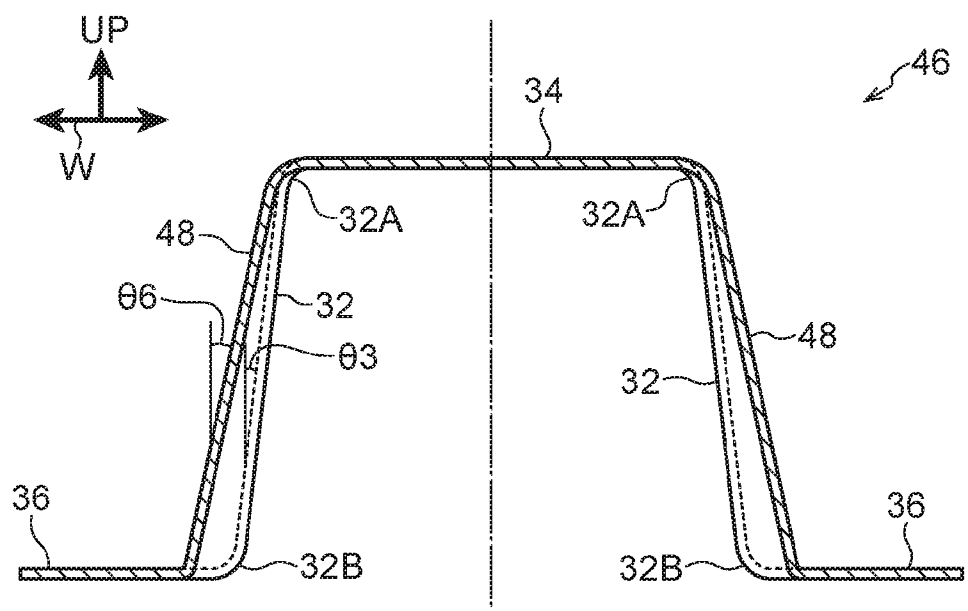
FIG. 7A and FIG. 7B are sectional views taken along line 7-7 in FIG. 6.
Figure 7B:
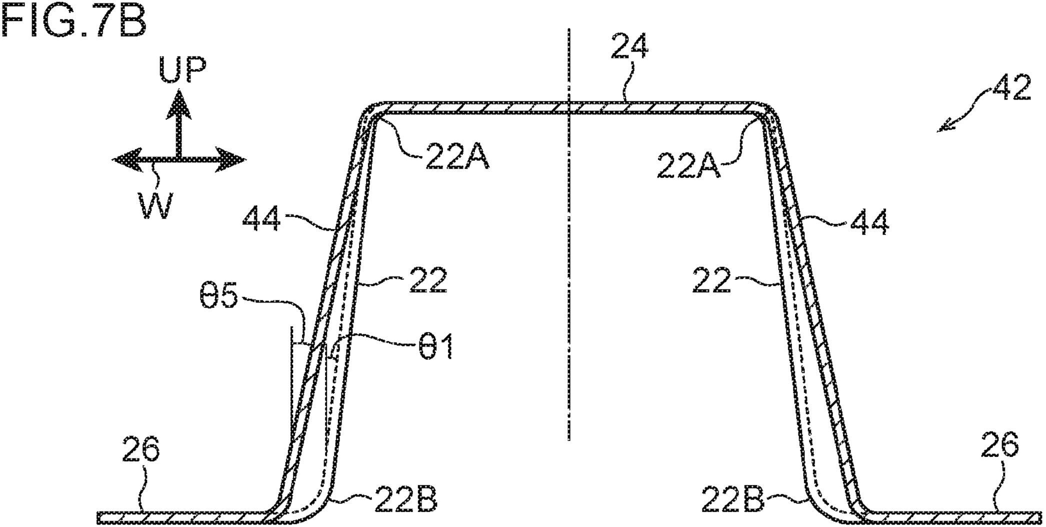

Inner side adhesion portions 44 are formed at the first panel member 42. Structures of the first panel member 42 apart from the inner side adhesion portions 44 are the same as the first panel member 20. At each of the pair of inner side vertical wall portions 22, the inner side adhesion portion 44 is formed at the one end side in the vehicle front-and-rear direction. The inner side adhesion portion 44 is formed in a protruding shape at which a portion of the inner side vertical wall portion 22 projects from the outer face thereof. As shown in FIG. 7B, the inner side adhesion portion 44 is inclined toward the vehicle width direction outer side from the one end side 22A toward the other end side 22B. The inclination angle of each inner side adhesion portion 44 with respect to the vehicle up-and-down direction is θ5. The inclination angle θ5 is set to be larger than the inclination angle θ1.

As shown in FIG. 6, outer side adhesion portions 48 are formed at the second panel member 46. Structures of the second panel member 46 apart from the outer side adhesion portions 48 are the same as the second panel member 30. At each of the pair of outer side vertical wall portions 32, the outer side adhesion portion 48 is formed at the another end side in the vehicle front-and-rear direction. The outer side adhesion portion 48 is formed in a protruding shape at which a portion of the outer side vertical wall portion 32 projects from the outer face thereof. A length of the outer side adhesion portion 48 in the vehicle front-and-rear direction is set to be shorter than the length of the inner side adhesion portion 44. As shown in FIG. 7A, the outer side adhesion portion 48 is inclined toward the vehicle width direction outer side from the one end side 32A toward the other end side 32B. The inclination angle of each outer side adhesion portion 48 with respect to the vehicle up-and-down direction is θ6. The inclination angle θ6 is set to be larger than the inclination angle θ3, and the inclination angle θ6 is set to be substantially the same as the inclination angle θ5 of the first panel member 42 or a little larger than the inclination angle θ5.

Figure 8:
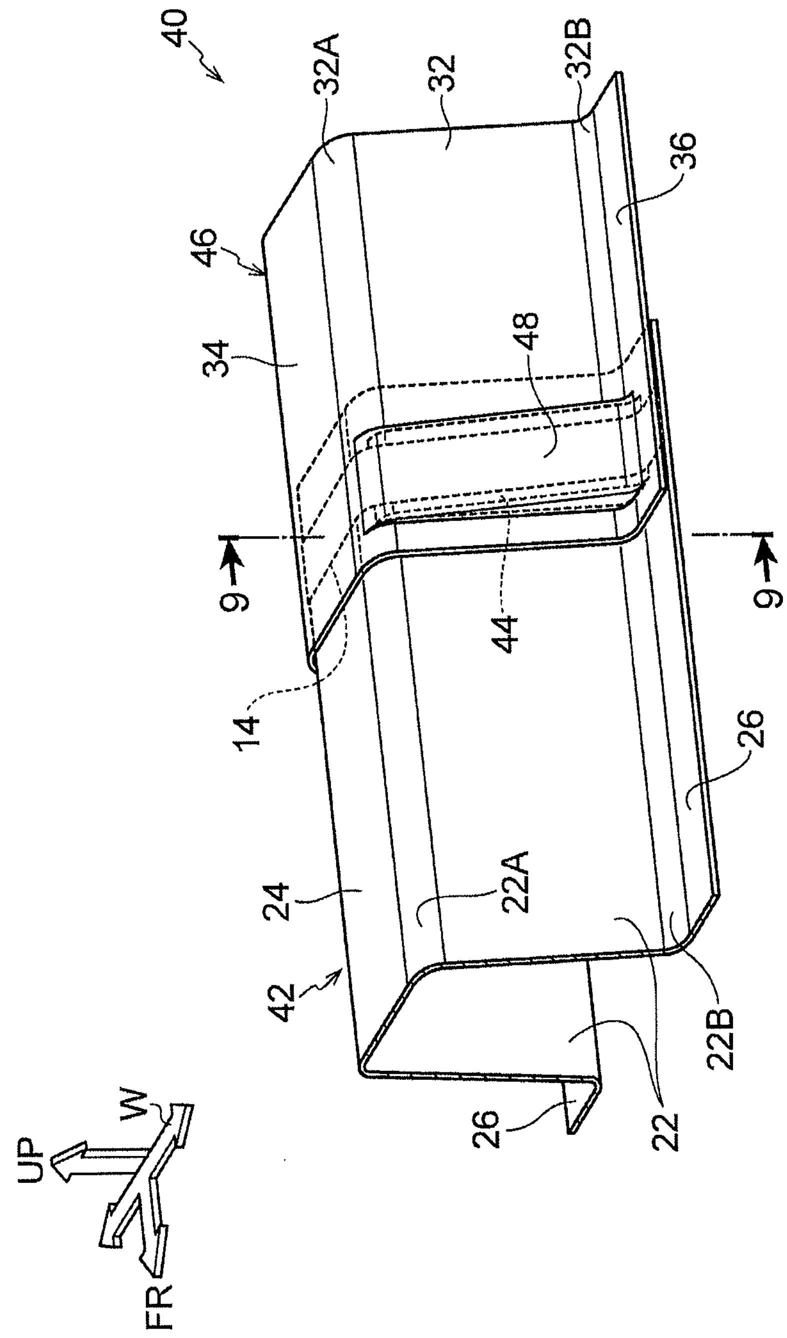
FIG. 8 is a perspective view showing a state when assembly of the second panel member to the first panel member in accordance with the second exemplary embodiment is completed.
Figure 9A:
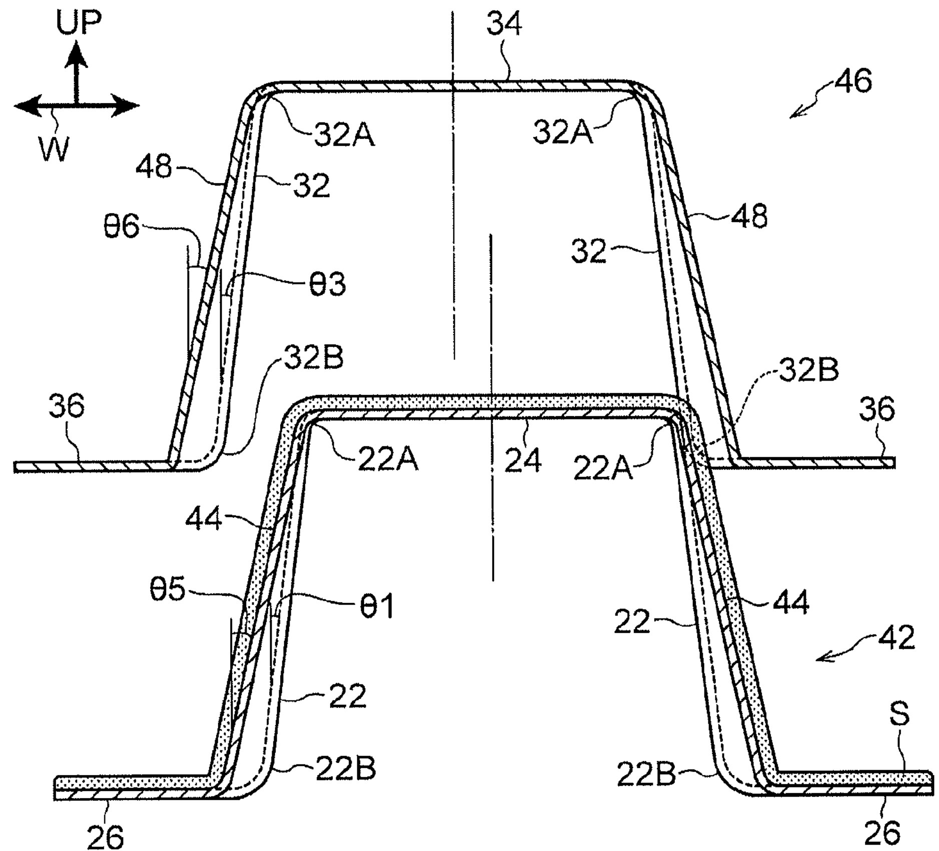
FIG. 9A is a sectional view showing a state partway through assembly of the second panel member to the first panel member.
Figure 9B:
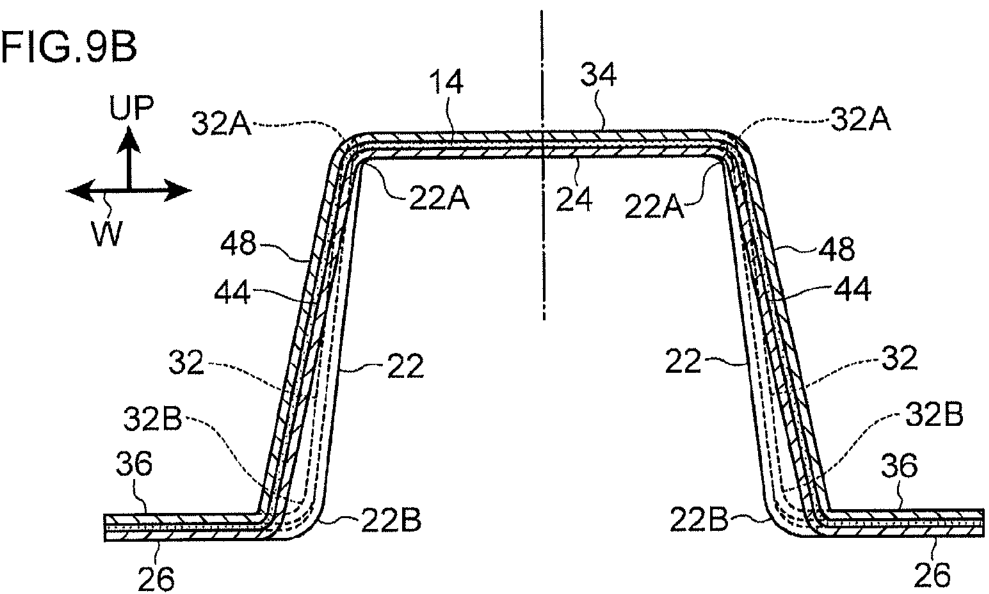
FIG. 9B is a sectional view showing a state when the assembly of the second panel member to the first panel member is completed.

As shown in FIG. 8 and FIG. 9B, the first panel member 42 and the second panel member 46 are superposed with the outer side adhesion portions 48 of the second panel member 46 being placed over the inner side adhesion portions 44 of the first panel member 42 from the vehicle upper side, and the first panel member 42 and second panel member 46 are joined via the adhesive layer 14. The first panel member 42 and second panel member 46 are joined with the pair of inner side adhesion portions 44 being disposed substantially in parallel with the pair of outer side adhesion portions 48.

Now, operation and effects of the present exemplary embodiment are described.

When the first panel member 42 and second panel member 46 are to be joined, the adhesive S is applied, along the line of the inner side adhesion portions 44 of the first panel member 42, to the first flange portions 26, the inner side adhesion portions 44 and the inner side connection portion 24 (see FIG. 6). Then, the second panel member 46 is disposed at the outer side of the first panel member 42, at a position at which the inner side adhesion portions 44 and the outer side adhesion portions 48 coincide, and the other end sides 32B of the second panel member 46 are moved from the one end sides 22A toward the other end sides 22B. During this movement, as illustrated in FIG. 9A, even if the second panel member 46 is tilted or displaced in one direction relative to the first panel member 42, because the inclination angle θ5 of the inner side adhesion portions 44 is greater than the inclination angle θ1 of the inner side vertical wall portions 22, the outer side vertical wall portions 32 come into contact with the inner side vertical wall portions 22 and move toward the other end sides 22B while being guided by the inner side vertical wall portions 22. Therefore, the outer side adhesion portions 48 can be disposed at an assembly completion position (see FIG. 9B) without coming into contact with the inner side adhesion portions 44 during the movement or, even if the outer side adhesion portions 48 do come into contact with the inner side adhesion portions 44 due to component errors or the like, the outer side adhesion portions 48 are in contact only with small regions in the vicinities of the other end sides 22B.

According to the panel joining structure 40 in accordance with the present exemplary embodiment, when the first panel member 42 and second panel member 46 are being assembled, the outer side adhesion portions 48 are unlikely to touch against the inner side adhesion portions 44 to which the adhesive S has been applied. Therefore, scraping off of the adhesive S during the assembly may be inhibited, and a reduction in joining strength between the first panel member 42 and the second panel member 46 may be suppressed.

Note that members fabricated of resin and members fabricated of a metal such as aluminium, steel or the like may be employed as the first panel member and second panel member of the first and second exemplary embodiments described above. Moreover, the first panel member and second panel member may be different materials from one another, such as a combination of a member fabricated of resin with a member fabricated of metal or the like.

What is claimed is:

1. A panel member joining structure, comprising:

a first panel member including a pair of inner side vertical wall portions that are disposed in opposition to one another;

a second panel member including a pair of outer side vertical wall portions that are disposed in opposition to one another and an outer side connection portion that connects ends at one side of the pair of outer side vertical wall portions, the second panel member being placed along outer sides of the inner side vertical wall portions of the first panel member, from ends at another side of the pair of outer side vertical wall portions, and the pair of outer side vertical wall portions being disposed at the outer sides of the pair of inner side vertical wall portions;

an inner side adhesion portion at which a portion of the inner side vertical wall portions is formed in a protruding shape or a recess shape such that an inclination angle of the inner side adhesion portion with respect to a direction of placement of the second panel member is greater than an inclination angle of the inner side vertical wall portions;

an outer side adhesion portion at which a portion of the outer side vertical wall portions is formed in whichever of a protruding shape or a recess shape is the same direction as the inner side adhesion portion such that an inclination angle of the outer side adhesion portion with respect to the direction of placement of the second panel member is greater than an inclination angle of the outer side vertical wall portions, the outer side adhesion portion being superimposed on the inner side adhesion portion; and an adhesive layer that adheres an outer face of the inner side adhesion portion to an inner face of the outer side adhesion portion.

2. The panel member joining structure according to claim 1, wherein the first panel member further includes an inner side connection portion that connects ends at one side of the pair of inner side vertical wall portions to one another.

3. The panel member joining structure according to claim 1, further comprising first flange portions that project in divergent directions from one another from ends at another side of the pair of inner side vertical wall portions of the first panel member.

4. The panel member joining structure according to claim 1, further comprising second flange portions that project in divergent directions from one another from the ends at the other side of the pair of outer side vertical wall portions of the second panel member.

* * * * *